(12) United States Patent
Wu et al.

(10) Patent No.: US 10,572,760 B1
(45) Date of Patent: Feb. 25, 2020

(54) IMAGE TEXT LOCALIZATION

(71) Applicant: Amazon Technologies, Inc., Seattle, WA (US)

(72) Inventors: Hao Wu, Seattle, WA (US); Jonathan Wu, Seattle, WA (US); Meng Wang, Seattle, WA (US); Wei Xia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 15/810,991

(22) Filed: Nov. 13, 2017

(51) Int. Cl.
G06K 9/00 (2006.01)
G06K 9/32 (2006.01)
G06K 9/18 (2006.01)
G06N 3/08 (2006.01)
G06K 9/62 (2006.01)
G06T 11/60 (2006.01)

(52) U.S. Cl.
CPC ....... G06K 9/3258 (2013.01); G06K 9/00456 (2013.01); G06K 9/18 (2013.01); G06K 9/3283 (2013.01); G06K 9/6267 (2013.01); G06N 3/084 (2013.01); G06T 11/60 (2013.01)

(58) Field of Classification Search
CPC .... G06K 9/6253; G06K 9/46; G06K 9/00228; G06K 9/6267; G06K 9/66; G06K 9/6216; G06K 9/4628; G06K 9/6255; G06K 9/32; G06K 9/2013; G06K 9/344; G06K 9/3258; G06K 9/18; G06N 3/0427; G06N 3/08; G06F 17/30249
See application file for complete search history.

(56) References Cited

U.S. PATENT DOCUMENTS

| | | | | |
|---|---|---|---|---|
| 5,706,097 A * | 1/1998 | Schelling | ............... | G03B 31/06 355/40 |
| 6,269,189 B1 * | 7/2001 | Chanod | ............ | G06F 16/90344 382/229 |
| 9,179,278 B2 * | 11/2015 | Das | ....................... | G06K 9/3258 |
| 9,256,889 B1 * | 2/2016 | Yun | ........................ | G06Q 10/00 |
| 9,275,052 B2 * | 3/2016 | Siegel | ..................... | G06F 21/10 |
| 9,792,530 B1 * | 10/2017 | Wu | ...................... | G06K 9/6253 |
| 2010/0054585 A1 * | 3/2010 | Guillou | ............... | G06K 9/3266 382/164 |
| 2012/0254709 A1 * | 10/2012 | Cok | ........................ | G06F 16/51 715/202 |
| 2016/0162782 A1 * | 6/2016 | Park | ..................... | G06N 3/0454 706/17 |

* cited by examiner

Primary Examiner — Amir Alavi
(74) Attorney, Agent, or Firm — Knobbe, Martens, Olson & Bear, LLP

(57) ABSTRACT

A method and system for analyzing text in an image is disclosed. A text localization and classification system accesses an annotated image comprising a plurality of text location identifiers for a given item of text. A neural network predicts the location of the given item of text using at least a first location identifier and a second location identifier. Optionally, the first location identifier comprises a first shape and the second location identifier comprises a second shape. A first loss is generated using a first loss function, the first loss corresponding to the predicated location using the first location identifier. A second loss is generated using a second loss function, the second loss corresponding to the predicated location using the second location identifier. The neural network is enhanced with backpropagation using the first loss and the second loss.

20 Claims, 6 Drawing Sheets

IMAGE TEXT LOCALIZATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Image analysis services are used to analyze an image of a scene and determine if items of text are present in the image. However, such text in images may be rotated or inclined, and hence can be difficult to accurately detect. Further, characters within a given text string may have variations in height, which may make it challenging to classify such text string as a text string.

Conventional image text processing systems ineffectively identify the locations of text within an image.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Embodiments described herein relate to localization of objects of interest, such as text, within an image using a detection and localization system. An embodiment utilizes a deep neural network configured to detect and localize objects of interest, such as text strings at a line level. The image of a text source, may be by way of non-limiting example, an image of a license plate, a road sign, a street address plaque or marker, a transaction receipt, an envelope, a business card, a clothing tag, a label, a retail store sign, a product packaging, a name tag, etc.

In one embodiment, localization is performed using one or more neural networks of the detection and localization system to identify region proposals (sometimes referred to herein as predictions) within the image. In one embodiment, a region proposal includes a portion of an image that detection and localization system predicts includes a text-based object. In one embodiment, localization is performed to identify a position or location of the region proposal within the image. In one embodiment, one or more neural networks identify one or more region proposals including an object of interest, such as a text line (e.g., a distinct string of one or more characters).

In one embodiment, the detection and localization system performs classification of the one or more detected objects. For example, a detected objected may be classified as text or non-text.

In one embodiment, the detection and localization system neural network optimizes or enhances its ability to localize and the classify objects associated with an image. In one embodiment, a joint loss function is employed to optimize both the localization of a region proposal and classification corresponding to a detected object in a substantially simultaneous manner.

In one embodiment, localization performed by a respective neural network results in a plurality of different shapes identifying, with different levels of precision, a position or location within the image of a proposed region of interest (e.g., a region including an object such as a text line). In one embodiment, the localization information includes shape coordinates that enable the orientation of a proposed region to be determined. In one embodiment, loss functions are used to determine a deviation of the coordinates of a given shape prediction from the actual or true coordinates. In one embodiment, different loss functions are used for different shapes. In one embodiment, the deviations determined by the loss functions are utilized in a backpropagation process to refine filter weights used in making the predictions.

Figure 1:
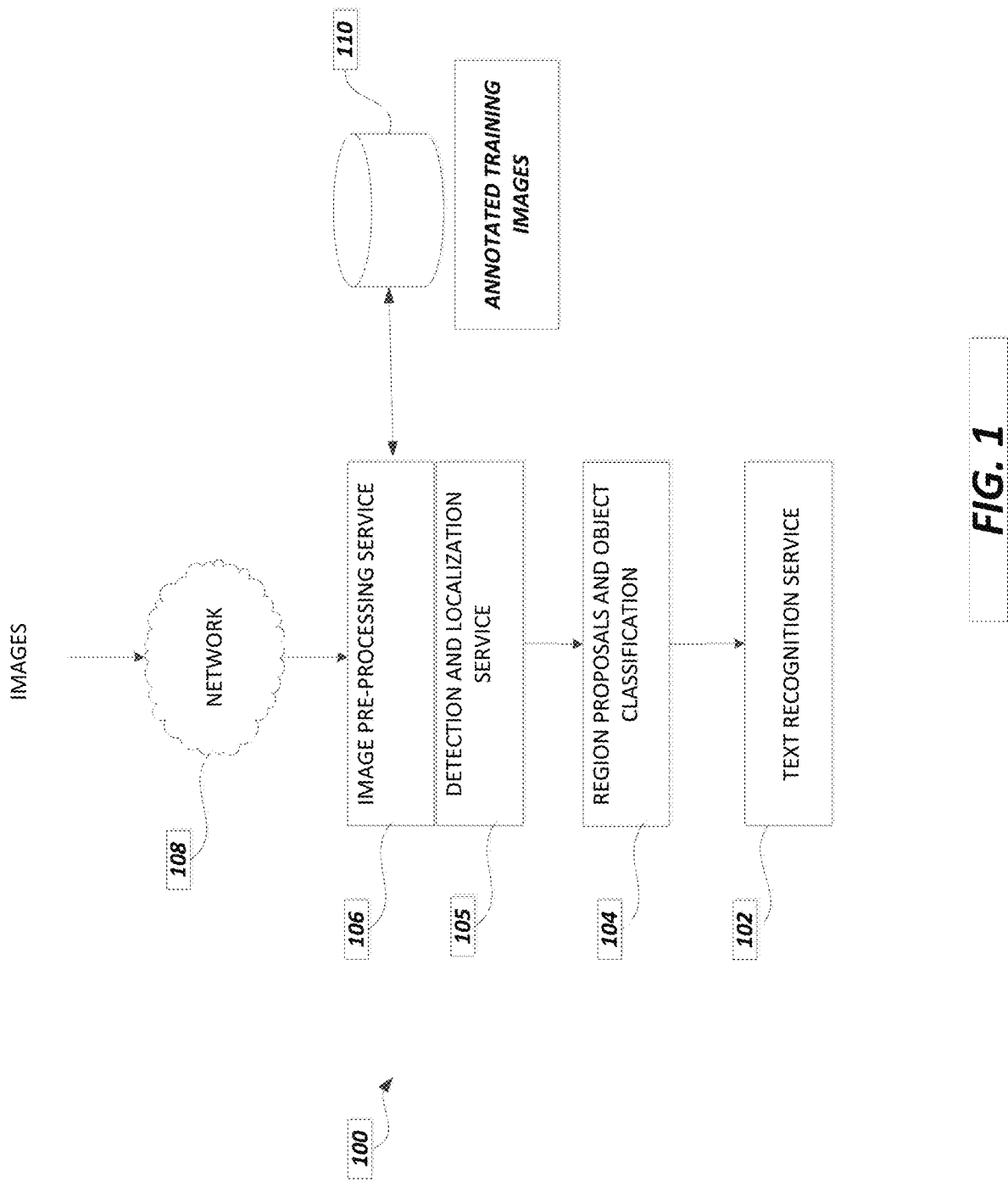
FIG. 1 illustrates an example image text recognition system, according to one embodiment.

FIG. 1 is a block diagram illustrating components of an example image text recognition system 100, according to one embodiment. In one embodiment, the image text recognition system 100 includes an image preprocessing service 106 which receives annotated images from a data store 110 of annotated images which may be used for training a neural network. The optional image preprocessing service 106 processes an image prior to the image being analyzed by a detection and localization service 105. For example, the optional image preprocessing service 106 may convert the image from one color space to another color space (e.g., RGB to grayscale, RGB to CIE XYZ, etc.) or may truncate portions of the image that are unlikely to have relevant objects of interest. By way of further example, in one embodiment, the image preprocessing service 106 generates multiple resolutions of the image. In one embodiment, the image preprocessing service 106 resizes the image to an optimal size and pads the re-sized image. In one embodiment, the multiple resolution versions of the image are provided by the image preprocessing service 106 to the detection and localization service 105 to enable the predictions of regions of interest (e.g., estimated localization shape coordinates), optionally across multiple image resolution scales that may be combined for a more robust localization estimate by the detection and localization service 105, and the text recognition service 102.

In one embodiment, the image (e.g., the pre-processed image, or the original image) is received by the detection and classification service 105, which is configured to identify objects of interest (e.g., text lines) and to classify objects identified in the image (e.g., as text or non-text). As discussed in greater detail herein, in one embodiment, the detection and classification service 105 includes a neural network, such as a region proposal and classification deep neural network. In one embodiment, the region proposal and classification deep neural network includes one or more convolutional neural networks. In one embodiment, the detection and localization service 105 generates region proposal location information and classification information 104 for objects of interest (e.g., text lines). In one embodiment, the detection and localization service 105 generates region proposal location information and classification information 104 for objects of interest using shapes that attempt to outline or encompass the objects of interest. In one embodiment, the detection and localization service 105 generates coordinate (e.g., x, y, orientation coordinates), dimension, and/or other position-related information for a given shape.

In one embodiment, the region proposal location information and classification information 104 is received by a text recognition service 102, which, in one embodiment, classifies and localizes the text line at a word and character level, and classifies the text source (e.g., as a license plate, a road sign, a street address plaque or marker, a transaction receipt, an envelope, a business card, a clothing tag, a label, a retail store sign, a name tag, etc.). The text recognition service 102 may further classify the contents of a text line. Non-limiting examples of text line content classification may include an address, a street name, a speed limit, a license plate number, a phone number, a zip code, a monetary value, a UPC, a serial number, a model number, a name, etc. The text recognition service 102 may include one or more multiple neural networks (e.g., CNNs) trained to perform such word and character localization and classification.

In one embodiment, the data store 110 stores annotated images. The annotated images may be annotated via a user-input process, such as a crowdsourcing system (e.g., Amazon® Mechanical Turk). In one embodiment, the user input is received via a user interface that displays an image to a user and provides tools (e.g., line and shape drawing tools) that enable the user to add text localization indicators. In one embodiment, the user interface provides tools that enable a user to annotate an object, such as a text line, with multiple different localization indicators, such as different shapes to outline or encompass such object. In one embodiment, the different shapes include an axis-aligned rectangle, a rotated rectangle, a four coordinate polygon, and/or an arbitrary N-coordinate polygon. The image annotations may be received over a network from user devices and stored in the data store 110. The annotated images may then be used to train the detection and localization service 105 and/or the text recognition service 102.

In one embodiment, the image text recognition system 100 receives non-annotated images over a network 108 from one or more remote devices (e.g., a personal computer, a smart phone, a tablet computer, a set-top box, a wearable device, etc.). In one embodiment, the network includes, by way of example, one or more of an intranet, an extranet, a wide area network, a wireless network, a wired network, the Internet or the like. In one embodiment, the image may be shared by a user from a social networking site, a commerce site, a blog, a microblog, an e-book or other electronic document, an image repository, or other source. The unannotated images may have been submitted by users for analysis by the image text recognition system 100 (e.g., for text localization or identification).

Figure 2:
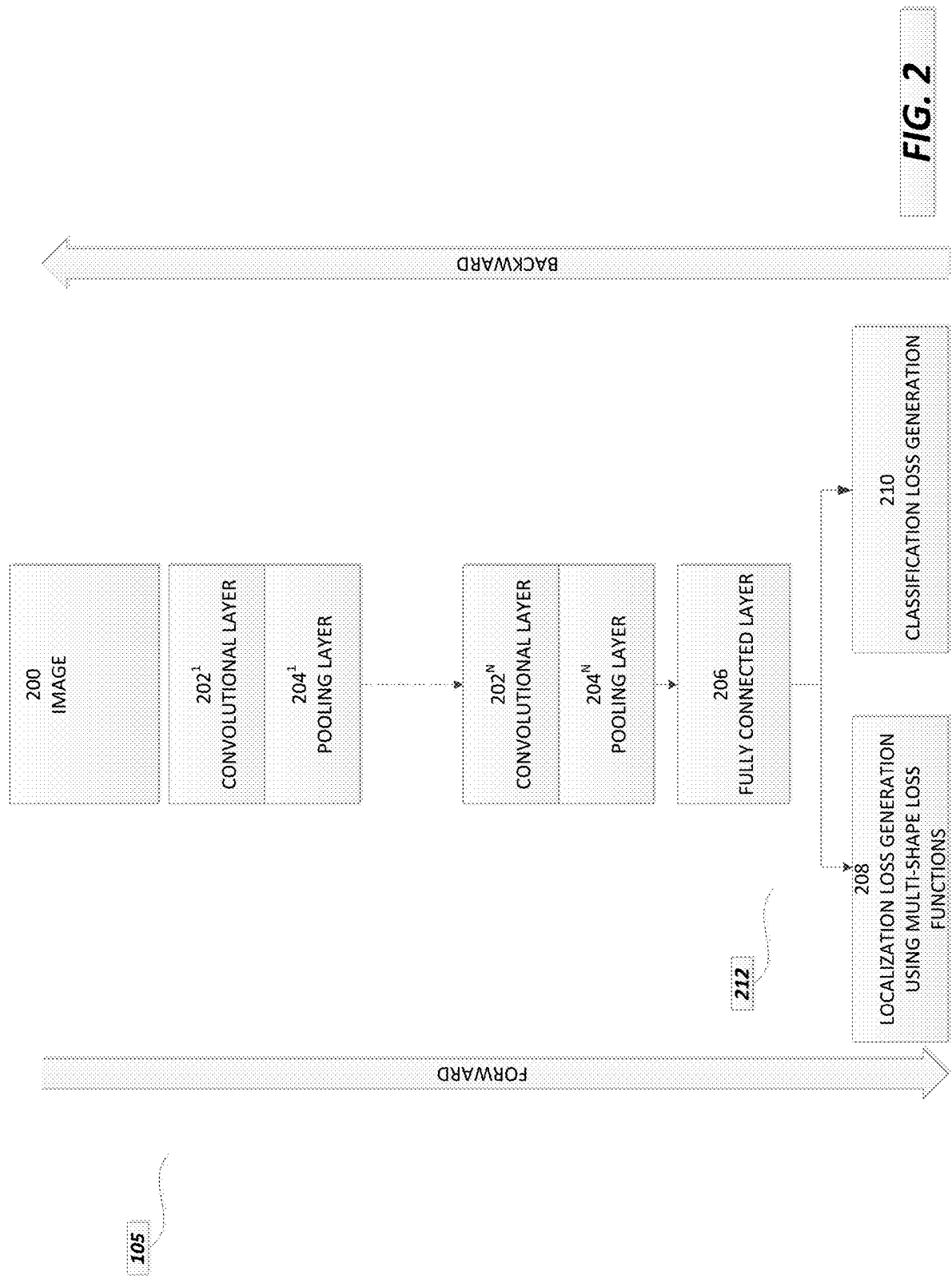
FIG. 2 illustrates an example detection and localization service, according to one embodiment.

FIG. 2 illustrates the example detection and localization service 105, according to one embodiment. The example detection and localization service 105 includes a deep neural network. In one embodiment, the deep neural network includes or is the form of a convolutional neural network (sometimes referred to herein as a CNN). In one embodiment, the convolutional neural network is an artificial feed-forward neural network with an input layer, one or more output layers, and intermediate layers (sometimes referred to as hidden layers). In one embodiment, multiple layers are provided at different resolution scales. In one embodiment, an intermediate layer may be a convolutional layer 202, a pooling layer 204, or a fully connected layer 206. In one embodiment, the CNN includes a loss layer 212. In one embodiment, the loss layer 212 generates localization loss information using multi-shape loss functions, and generates a classification loss.

In one embodiment, the CNN is used to classify objects (e.g., with a label) within an image as being a text line or not a text line, and localizes objects of interest, such as text lines, by identifying a region proposal using multiple, different localizers (sometimes referred to herein as localization indicators) for a given object of interest. In one embodiment, the different localization indicators are in the form of different shapes that localize text (outline or encompass the text) with different corresponding levels of granularity, such as coarse to fine. In one embodiment, a given shape location is specified using x and y coordinates (e.g., for one or more vertices), orientation (e.g., angles), width and height dimensions, or some combination of the foregoing.

In one embodiment, the CNN is configured to be trained to localize objects of interest and to classify objects of interest, such as text lines. A training image 200, with annotated text lines is received by the CNN for training. In one embodiment, the image is in the form of pixels, having a height h, a width w, and a depth d (e.g., were d=3 for an RGB image).

In one embodiment, a given convolutional layer 202 convolves image data with a filter and passes the result to the next layer. The convolutional layers 202" thereby may be used to perform feature extractions. In one embodiment, the filters are initialized randomly or to an untrained value. In one embodiment, a training process is utilized to modify and enhance the filters (e.g., the filter weights and/or biases) using backpropagation.

In one embodiment, the CNN includes one or more pooling layers $204^{1-N}$, which perform non-linear down-sampling using one or more non-linear functions, to thereby progressively reduce the spatial size of the image representation, thus reducing the amount of computation and parameters in the CNN. One embodiment uses a max pooling layer or an average pooling layer. One embodiment does not include pooling layers.

In one embodiment, the CNN includes one or more non-saturating activation layers, such as a ReLU layer, to enhance nonlinear properties of the decision function and of the overall CNN. One embodiment of the CNN does not include a ReLU layer or the like.

In one embodiment, the CNN includes a fully connected layer 206. In one embodiment, the fully connected layer 206 has neurons that have connections to all activations in the previous CNN layer.

In one embodiment, the CNN includes a loss layer 212 that specifies how training penalizes deviations between the predicted or proposed localization indicators and true localization indicators (from the annotated image 200) and between the class predictions and the true classes, to thereby train the CNN to reduce such deviations and to more accurately predict localizations and classifications.

In one embodiment, the training image 200 includes a scene with one or more annotated lines of text. In one embodiment, a given line of text is annotated using one or more different localization indicators (e.g., different shapes that outline or encompass the text line). In one embodiment, the different localization indicators include different shapes with different levels of fineness. In one embodiment, at least two localization indicators of different fineness are used to localize a text line. In one embodiment, at least three localization indicators of different fineness are used to localize a text line. In one embodiment, at least four localization indicators of different fineness are used to localize a text line. In one embodiment, more than four localization indicators of different fineness are used to localize a text line.

In one embodiment, a given line of text may be annotated using one or more of the following non-limiting example shapes:
- an axis-aligned rectangle;
- a rotated rectangle;
- a four coordinate polygon;
- an arbitrary N-coordinate polygon (e.g., with three vertices, or at least five vertices).

In one embodiment, an axis-aligned rectangle may be characterized by an anchor point (e.g., a corner) having a horizontal coordinate and a vertical coordinate, and a corresponding rectangle height and width using the following parameters: [x, y, width, height].

In one embodiment, a rotated rectangle may be characterized by an anchor point (e.g., a corner) having a horizontal coordinate and a vertical coordinate, a corresponding rectangle height and width, and a rotation angle using the following parameters: [x, y, width, height, angle].

In one embodiment, a four coordinate polygon may be characterized by horizontal coordinate and vertical coordinates for each vertex using the following parameters: [x1, y1, x2, y2, x3, y3, x4, y4].

In one embodiment, an arbitrary N-coordinate polygon may be characterized by horizontal coordinate and vertical coordinates for each vertex using the following parameters: [x1, y1, x2, y2, x3, y3, x4, y4 . . . xN, yN].

In one embodiment, at the coarsest level, an axis-aligned rectangle captures the location of text with background space, and at the finest level, an N-point polygon, denoting a segmentation shape, tightly captures the location of the text without background space. In one embodiment, at the coarsest level, an axis-aligned rectangle captures the location of the text, at the next less coarse level, a rotated rectangle captures the location of the text inclined at an angle corresponding to the text angle, at the next less coarse level, a four coordinate polygon more finely captures the location of the text, and at the finest level, an N-point polygon, denoting a segmentation shape, tightly captures the location of the text without background space.

The CNN predicts the locations of each shape (e.g., using coordinates, angles, heights, widths, or any combination thereof). In one embodiment, the CNN simultaneously predicts a set of coarse-to-fine shapes for text localization. In one embodiment, the CNN generates, using a classification loss generation module 210, a classification for objects detected in the image. In one embodiment, a classification may indicate that a given object is text or is not text.

In one embodiment, a localization loss generation module 208 utilizes a different loss function to generate a loss for each shape. In one embodiment, loss functions are used to train the CNN and reduce or minimize the difference between a predicted location and a true location (as indicated in the annotated image) for a given shape and to more accurately classify text objects. In one embodiment, a joint loss function is employed to optimize both the localization of a location prediction and classification corresponding to a detected object in a substantially simultaneous manner.

In one embodiment, a joint loss function $L_{all}$ can be represented as:

$$L_{all} = \alpha_1 L_{shape-type1} + \alpha_2 L_{shape-type2} + \alpha_3 L_{shape-type3} + \ldots \alpha_N L_{shape-typeN} + \alpha_{N+1} L_{classification}$$

Thus, in one embodiment, multiple localization loss functions are used, where the localization loss function used depends on the type of localization indicator (e.g., the shape of the localizer). In one embodiment, the output of the loss layer 212 is backpropagated through the CNN, and the CNN weights and/or biases are adjusted accordingly to enhance the accuracy of the predictions.

In one embodiment, one or more of the following loss functions are used: a smooth L1 (Least absolute deviations (LAD)) loss function, an L2 (Least square errors) loss function, and/or an Intersection over Union (IoU) loss function. In other embodiments, other loss functions are used.

The L1 loss function minimizes the absolute differences between the predicted values and the true of existing target values, according to one embodiment. The L2 loss function minimizes the squared differences between the predicted values and the true of existing target values, according to one embodiment. Because the L2 loss function squares the differences between the predicted values and the true value, the L2 loss function will generate larger error values as compared to L1, and will be more sensitive to outlier values. Thus, in certain circumstances, the CNN model will be adjusted to minimize an outlier case, which may adversely affect the prediction of more common non-outlier cases, as the errors of the more common cases may be small compared to that single outlier case. On the other hand, the L2 loss function may provide more stability than the smooth L1 loss function.

In one embodiment, the Intersection over Union (IoU) loss function calculates a ratio. The numerator of the ratio corresponds to the area of overlap between the predicted shape and the true shape (the annotation shape). The denominator corresponds to the area encompassed by both the predicted shape and the true shape. The IoU function rewards predicted shapes for heavily overlapping with the true shape, and so maximizes overlap.

In one embodiment, the classification loss generation module 210 utilizes a normalized exponential function, such as a softmax loss function, to generate a probability distribution over different possible outcomes (e.g., that a detected object is a text line or is not a text line).

Figure 3:
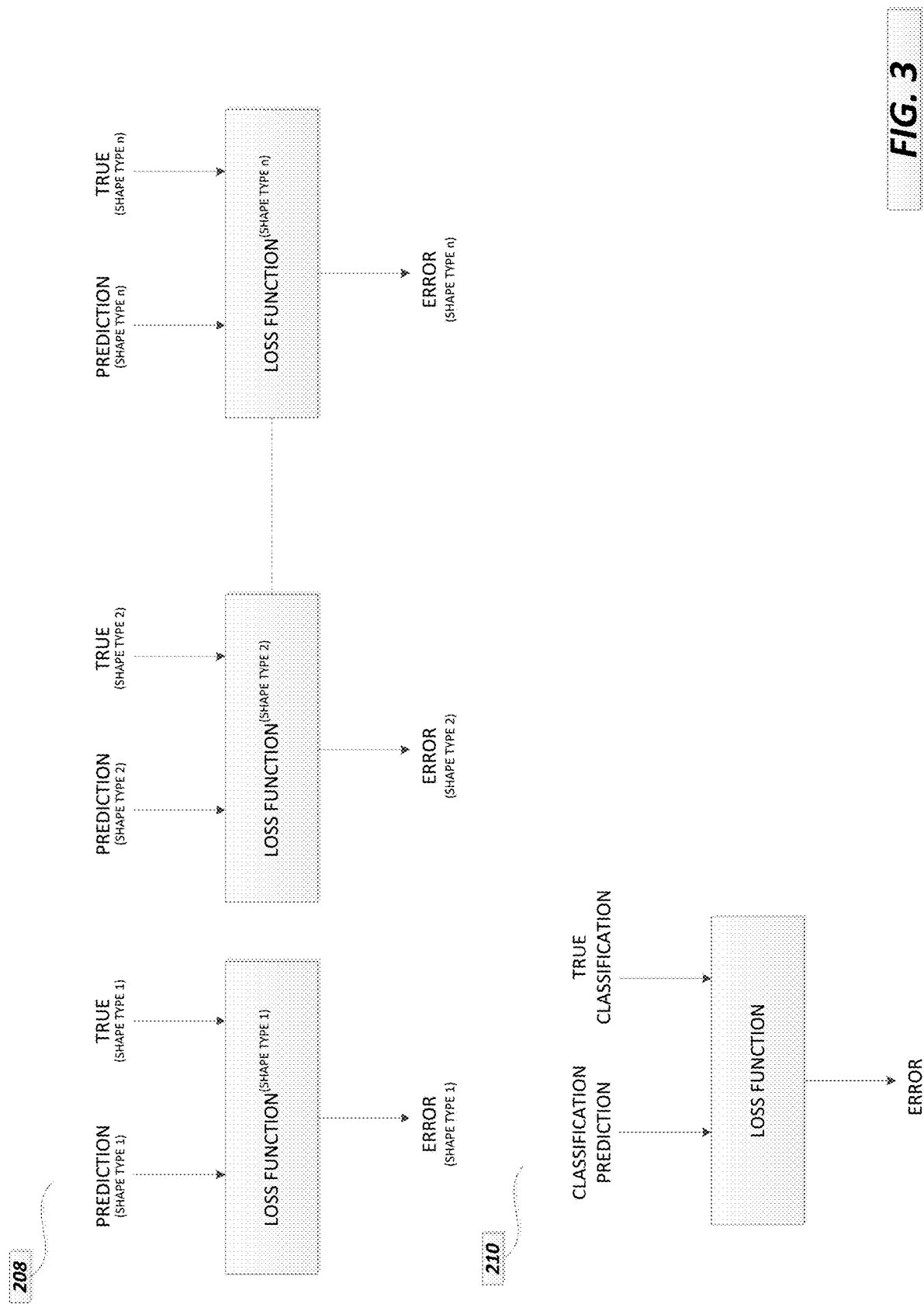
FIG. 3 illustrates an example embodiment of a loss layer, according to one embodiment.

FIG. 3 illustrates an example embodiment of the localization loss generation module 208 and the classification loss generation module 210, according to one embodiment. In one embodiment, the localization loss generation module 208 includes a loss function for each localization shape. In one embodiment, each loss function is different.

A given loss function for a given shape inputs a localization prediction generated by the CNN for a given shape and the true localization as specified in the annotated image. The given loss function outputs an error indicating, for the corresponding localization shape, the deviation of the localization prediction from the true location of the text line. The localization loss generation module 208 may include n loss functions corresponding to n localization shapes.

The classification loss generation module 210 inputs the classification prediction and the true classification and outputs an error indicating, the classification prediction from the true classification. The localization and classification errors are backpropagated through the CNN as illustrated in FIG. 2, and the CNN weights and/or biases are adjusted accordingly to enhance the accuracy of the predictions.

Figure 4:
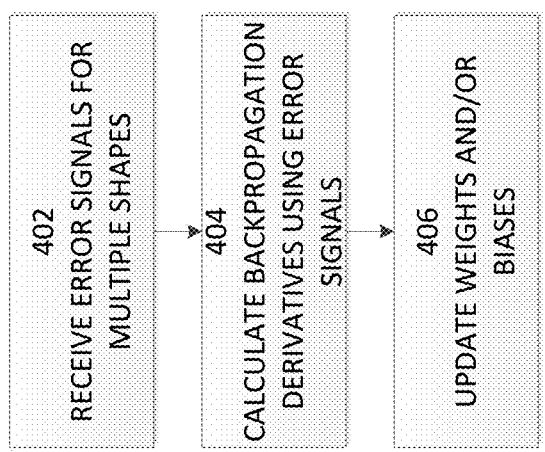
FIG. 4 illustrates an example backpropagation process, according to one embodiment.

FIG. 4 illustrates an example backpropagation process, according to one embodiment. In one embodiment, error signals are received for multiple localization indicators, such as multiple localization shapes. At block 404, backpropagation derivatives are calculated using the error signals. At block 406, the derivatives and corresponding current weights are used to determine updated weights and/or biases, which, in one embodiment, are backpropagated through the CNN.

Figure 5:
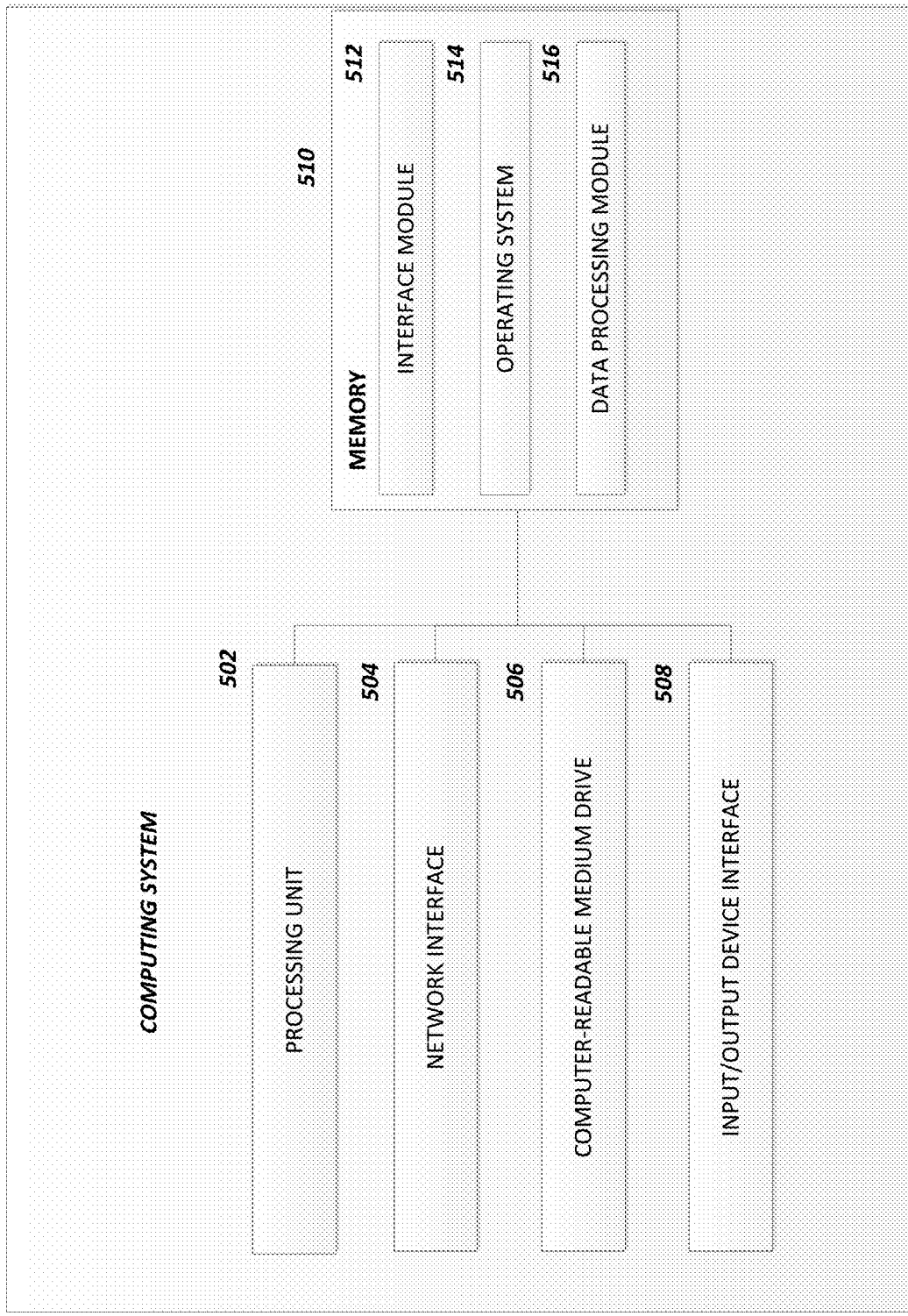
FIG. 5 illustrates an example computing environment executing instructions relating to an image text recognition system, according to one embodiment.

FIG. 5 is a block diagram illustrating an embodiment of example components of a computing system 500 configured to perform any one or more of the processes and corresponding components shown and described in connection with FIGS. 1-4. The example computing system 500 includes an arrangement of computer hardware and software components that may be used to implement aspects of the present disclosure. Those skilled in the art will appreciate that the example components may include more (or fewer) components than those depicted in FIG. 5.

The computing system 500 includes a processing unit 502, a network interface 504, a non-transitory computer-readable medium drive 506, and an input/output device interface 508, all of which may communicate with one another by way of a communication bus, according to one embodiment. The network interface 504 provides the image preprocessing service 106, the detection and localization service 105, and/or the text recognition service 102 with connectivity to one or more networks or computing systems. The processing unit 502 may thus receive images, information, and instructions from other computing devices, systems, or services via one or more networks. The processing unit 502 may also communicate to and from memory 510 and further provide output information (e.g., images with predicted localization indicators) via the input/output device interface 508. The input/output device interface 508 may also accept input (e.g., image annotations) from various input devices, such as a keyboard, mouse, digital pen, touch screen, etc.

The memory 510 may contain computer program instructions that the processing unit 502 may execute in order to implement one or more embodiments of the present disclosure. The memory 510 generally includes RAM, ROM and/or other persistent or non-transitory computer-readable storage media. The memory 510 may store an operating system 514 that provides computer program instructions for use by the processing unit 502 in the general administration and operation of the text recognition system 100, including the detection and localization service 105. The memory 510 may further include other information for implementing aspects of the present disclosure.

In an example embodiment, the memory 510 includes an interface module 512. The interface module 512 can be configured to facilitate generating one or more user interfaces through which a user, utilizing a compatible computing device, may send to, or receive from, the text recognition system 100, including the detection and localization service 105, images, image annotations, predicted localizations, classifications, text recognition information, etc., or otherwise communicate with the text recognition system 100.

For example, a user may submit, to the text recognition system 100, an image to be analyzed, receive an analyzed image including text localization indicators, submit an manually annotated image to be used for training, using respective user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 510 may include a data processing module 516 that may be executed by the processing unit 502. In an example embodiment, the data processing module 516 implements aspects of the present disclosure. For example, the data processing module 516 can be configured to process image, image annotations, user queries, instructions, and/or training data from the data store 110, to generate text line localizations and classifications.

It should be noted that the text recognition system 100, including the image pre-processing service 106, detection and localization service 105, and text recognition service 102 may be implemented by some or all of the components present in the computing system 500 as discussed herein with respect to FIG. 5. In addition, the text recognition system 100, including the image pre-processing service 106, detection and localization service 105, and text recognition service 102, may include additional components not present in FIG. 5. The modules or components described above may also include additional modules or be implemented by computing devices that may not be depicted in FIGS. 1-5. For example, although the interface module 512 and the data processing module 516 are identified in FIG. 5 as single modules, one skilled in the relevant art will appreciate that the modules may be implemented by two or more modules and in a distributed manner. As another example, the computing system 500 and its components can be implemented by network servers, application servers, database servers, combinations of the same, or the like, configured to facilitate data transmission to and from the data store 110, remote user devices, or other image sources, via network 108. Accordingly, the depictions of the modules are illustrative in nature.

Figure 6:
FIG. 6 illustrates an example image processed by an example localization and classification system, according to one embodiment.
Figure 6:
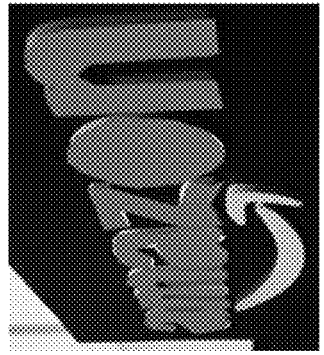
Figure 6:
Figure 6:

FIG. 6 illustrates an example image processed by an example localization and classification system, according to one embodiment. The image may have been submitted by a user via an interface for analysis by an image text recognition system, such as that illustrated in FIG. 1. The image has been processed as described in detail above with respect to FIGS. 1-5. In this example, the detection and localization service has predicted the location of the same text line using, from course to fine, an axis-aligned rectangle 602, a rotated rectangle 604, a four coordinate polygon 606, and an arbitrary N-coordinate polygon 608. Although the example depicts the text line four times, with each instance with a different localization indicator, in one embodiment, all the localization indicators are depicted at the same time, using a single depiction of the text line.

Thus, described herein are various examples of methods and systems for performing object localization and classification.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method, comprising:
    accessing an annotated image, the annotated image comprising at least:
        a first location identifier identifying a location of a first item of text in the annotated image with a first level of precision, and
        a second location identifier, different than the first location identifier, identifying the location of the first item of text in the annotated image with a second level of precision;
    utilizing a convolutional neural network to predict the location of the first item of text in the image using the first location identifier and the second location identifier;
    generating a first loss using a first loss function associated with the first location identifier, the first loss corresponding to the predicted location using the first location identifier;
    generating a second loss using a second loss function associated with the second location identifier, the second loss corresponding to the predicted location using the second location identifier; and
    enhancing the convolutional neural network with backpropagation using the first loss and the second loss.

2. The method as recited in claim 1, the method further comprising:
    concurrently generating a classification loss with the generation of the first loss and the second loss.

3. The method as recited in claim 1, wherein the first loss function comprises a smooth L1 loss function, an L2 loss function, and/or an Intersection over Union (IoU) loss function.

4. The method as recited in claim 1, wherein the first loss and the second loss are generated concurrently.

5. The method as recited in claim 1, wherein the first location identifier comprises a first shape and the second location identifier comprises a second shape.

6. The method as recited in claim 1, wherein the first location identifier comprises a first shape and the second location identifier comprises a second shape, the second shape finer than the first shape,
    wherein the annotated image further comprises:
        a third shape, finer than the second shape, identifying the location of the first item of text in the annotated image with a third level of precision, and
        a fourth shape, finer than the third shape, identifying the location of the first item of text in the annotated image with a fourth level of precision,
    the method further comprising:
        concurrently generating, with the first loss and the second loss, a third loss using a third loss function associated with the third shape, the third loss corresponding to the predicted location using the third shape, and generating a fourth loss using a fourth loss function associated with the fourth shape, the fourth loss corresponding to the predicted location using the fourth shape.

7. The method as recited in claim 6, wherein the first shape is an axis-aligned rectangle, the second shape is a rotated rectangle, the third shape is a four coordinate polygon, and the fourth shape is an N-coordinate polygon having at least five vertices.

8. A system comprising:
non-transitory memory configured to store computer-executable instructions; and
a hardware processor in communication with the non-transitory memory, the hardware processor, configured to execute the computer-executable instructions to at least:
access an annotated image, the annotated image comprising at least:
a first location identifier identifying a location of a first item of text in the annotated image with a first level of precision, and
a second location identifier, different than the first location identifier, identifying the location of the first item of text in the annotated image with a second level of precision;
utilize a neural network to predict the location of the first item of text in the image using the first location identifier and the second location identifier;
generate a first loss using a first loss function associated with the first location identifier, the first loss corresponding to the predicted location using the first location identifier;
generate a second loss using a second loss function associated with the second location identifier, the second loss corresponding to the predicted location using the second location identifier; and
enhance the neural network with backpropagation using the first loss and the second loss.

9. The system as defined in claim 8, wherein the enhancement of the neural network with backpropagation using the first loss and the second loss comprises adjusting one or more weights.

10. The system as defined in claim 8, wherein the first loss function comprises a smooth L1 loss function, an L2 loss function, and/or an Intersection over Union (IoU) loss function.

11. The system as defined in claim 8, wherein the first loss and the second loss are generated concurrently.

12. The system as defined in claim 8, wherein the first location identifier comprises a first shape and the second location identifier comprises a second shape.

13. The system as defined in claim 8, wherein the first location identifier comprises a first shape and the second location identifier comprises a second shape,
wherein the annotated image further comprises:
a third shape, finer than the second shape, identifying the location of the first item of text in the annotated image with a third level of precision, and
a fourth shape, finer than the third shape, identifying the location of the first item of text in the annotated image with a fourth level of precision,
wherein the system is further configured to:
concurrently generate, with the first loss and the second loss, a third loss using a third loss function associated with the third shape, the third loss corresponding to the predicted location using the third shape, and generating a fourth loss using a fourth loss function associated with the fourth shape, the fourth loss corresponding to the predicted location using the fourth shape.

14. The system as defined in claim 13, wherein the enhancement of the neural network with backpropagation using the first loss and the second loss comprises adjusting one or more weights.

15. Non-transitory memory that stores computer-executable instructions that, when executed by a processing device, cause the processing device to at least:
access an annotated image, the annotated image comprising at least:
a first location identifier identifying a location of a first item of text in the annotated image with a first level of precision, and
a second location identifier, different than the first location identifier, identifying the location of the first item of text in the annotated image with a second level of precision;
utilize a neural network to predict the first item of text location in the image using the first location identifier and the second location identifier;
generate a first loss using a first loss function associated with the first location identifier, the first loss corresponding to the predicted location using the first location identifier;
generate a second loss using a second loss function associated with the second location identifier, the second loss corresponding to the predicted location using the second location identifier; and
enhance the neural network with backpropagation using the first loss and the second loss.

16. The non-transitory memory as defined in claim 15, wherein the enhancement of the neural network with backpropagation using the first loss and the second loss comprises adjusting one or more weights.

17. The non-transitory memory as defined in claim 15, wherein the first loss function comprises a smooth L1 loss function, an L2 loss function, and/or an Intersection over Union (IoU) loss function.

18. The non-transitory memory as defined in claim 15, wherein the first loss and the second loss are generated concurrently.

19. The non-transitory memory as defined in claim 15, wherein the first location identifier comprises a first shape and the second location identifier comprises a second shape.

20. The non-transitory memory as defined in claim 15, wherein the first location identifier comprises a first shape and the second location identifier comprises a second shape,
wherein the annotated image further comprises:
a third shape, finer than the second shape, identifying the location of the first item of text in the annotated image with a third level of precision, and
a fourth shape, finer than the third shape, identifying the location of the first item of text in the annotated image with a fourth level of precision,
wherein the computer-executable instructions, when executed by a processing device, are further configured to cause the processing device to at least:
concurrently generate, with the first loss and the second loss, a third loss using a third loss function associated with the third shape, the third loss corresponding to the predicted location using the third shape, and generating a fourth loss using a fourth loss function associated with the fourth shape, the fourth loss corresponding to the predicted location using the fourth shape.

* * * * *